United States Patent [19]

Matthies

[11] Patent Number: 4,754,174

[45] Date of Patent: Jun. 28, 1988

[54] CIRCUIT ARRANGEMENT FOR DERIVING A CONTROL SIGNAL

[75] Inventor: Karl-Heinz Matthies, Hamburg, Fed. Rep. of Germany

[73] Assignee: U.S. Philips Corporation, New York, N.Y.

[21] Appl. No.: 800,945

[22] Filed: Nov. 22, 1985

[30] Foreign Application Priority Data

Dec. 1, 1984 [DE] Fed. Rep. of Germany ....... 3443924

[51] Int. Cl.$^4$ .......................... H03D 3/06; H03K 9/04
[52] U.S. Cl. .................................... 307/511; 307/262; 307/513; 328/55; 328/133; 328/109
[58] Field of Search .................... 307/511, 513, 262; 328/24, 55, 109, 118, 133; 375/118; 329/137

[56] References Cited

U.S. PATENT DOCUMENTS 3,059,187 10/1962 Jaffe ...................................... 328/109
3,993,956 11/1976 Gilmore et al. ....................... 325/320

FOREIGN PATENT DOCUMENTS 2091971 8/1982 United Kingdom ..................... 8/130

Primary Examiner—Stanley D. Miller
Assistant Examiner—Richard Roseen
Attorney, Agent, or Firm—Thomas A. Briody; Jack E. Haken; Anne E. Barschall

[57] ABSTRACT

A circuit arrangement for deriving a control signal from a synchronizing signal whose phase alternates in a predetermined sequence, which control signal is independent of the phase alternation, comprises a reference oscillator (1) which supplies a reference signal, a phase comparator (5) for deriving a phase signal from a synchronizing signal and a reference signal, a correction circuit (22, 26) for generating a correction signal, and a logic combination device (10) for superimposing the phase signal and the correction signal on the control signal. In accordance with the invention control signal variations as a result of the phase alternations in the synchronizing signal are eliminated in that the correction circuit (22, 26) generates a polarity signal which dictates the polarity of the correction signal by comparing the phase of the reference signal and the phase of the synchronizing signal.

5 Claims, 1 Drawing Sheet

CIRCUIT ARRANGEMENT FOR DERIVING A CONTROL SIGNAL

BACKGROUND OF THE INVENTION

1. Field of the Invention

The invention relates to a circuit arrangement for deriving a control signal from a synchronising signal whose phase alternates in a predetermined sequence. The control signal is independent of the predetermined phase alternation. The arrangement comprises a reference oscillator for supplying a reference signal of a specific frequency and phase, a phase-comparator means for generating a phase signal corresponding to the phase difference between the synchronising signal and the reference signal, a correction circuit for generating a correction signal of predetermined amplitude and a polarity dictated by the phase signal, and a logic combination device for superimposing the phase signal and the correction signal on the control signal so as to cancel control-signal variations caused by the phase alternation of the synchronising signal.

2. Prior Art

DE-PS 32 02 210 describes a device for processing a PAL color video signal, in which a reference output signal supplied by a reference oscillator is applied to a phase comparator which also receives a chrominance signal of carrier frequency. The phase comparator compares the phase of the carrier-frequency chrominance signal with the phase of the reference output signal of color-subcarrier frequency. The phase comparator effects phase comparison between the carrier-frequency chrominance signal and the reference output signal during the color-burst period. The output signal of the phase comparator is applied to a variable-frequency oscillator via an adder and low-pass filter as a control signal to control the frequency of this oscillator.

When a PAL color video signal is processed, the phase of the color-burst signal applied to the phase comparator in a horizontal scanning period has changed about 90° in comparison with that in the next horizontal scanning period and the circuit arrangement operates in such a way that the average phase of the color-burst signal is in synchronism with the phase of the reference output signal. This results in phase errors appearing on the output of the phase comparator, which errors correspond to a phase shift of approximately 45° and have different polarities in alternate horizontal scanning periods. If the signal from the output of the phase comparator is applied directly to the variable-frequency oscillator via the low-pass filter its frequency will change every line, thereby introducing a phase variation of the carrier-frequency chrominance signal in said line.

Therefore, the known circuit arrangement is provided with a correction circuit in order to preclude such an undesired chrominance variation in the lines. This correction circuit comprises a circuit for extracting, processing and dividing the horizontal synchronizing signal contained in the color video signal to produce a continuous pulse signal of half the horizontal frequency. This pulse signal is applied to a current source via a phase inverter to control the polarity of a constant direct curent supplied by this current source. In the adder this direct current is superimposed on the output signal of the phase comparator.

In order to ensure that a current of the correct polarity is superimposed on the output signal of the phase conparator, i.e. in such a way that components of half the line frequency contained in said output signal are cancelled, the control signal is applied from the output of the low-pass filter to a pulse counter via a high-pass filter, a half-wave rectifier and a pulse shaper, which pulse counter counts the pulses appearing on the output of the low-pass filter. When the counter has counted four pulses this causes a transition from the "0" level to the "1" level in the output signal of the pulse counter. This transition triggers a flip-flop, which changes over a phase inverter by means of which the polarity of the signal of half the horizontal frequency and hence the polarity of the current supplied to the adder by the current source is changed. By means of a signal of 1/16 horizontal frequency derived from the signal of half the horizontal frequency, the pulse counter is reset to its initial state at regular intervals.

The known circuit arrangement is very intricate and does not operate reliably. Moreover, in the event of a fault condition, i.e. in the case that the polarity of the current supplied by the current source is not in conformity with the output signal of the phase comparator, at least eight horizontal periods are needed to correct the polarity of the current and thus to eliminate chrominance errors in the known circuit arrangement. Such a fault in a picture reproduced by means of the color video signal is very annoying to the viewer.

SUMMARY OF THE INVENTION

It is the object of the invention to construct a circuit arrangement of the type defined in the opening paragraph in such a way that the control signal is generated independently of faults in the synchronising signal so as to guarantee an effective and continuous suppression of the influence of the periodic phase alternation in the synchronising signal.

In accordance with the invention this object is achieved in a circuit arrangement of the type defined in the opening paragraph in that the correction circuit is adapted to generate a polarity signal which dictates the polarity of the correction signal and which is obtained by the phase comparison between the reference signal and the synchronising signal.

The invention is based on the recognition of the fact that the phase comparison between the reference signal and the synchronising signal not only provides unambiguous and correct information about the phase difference between these signals but also about the polarity of the correction signal. This polarity is always opposite to the polarity of the phase-alternating components in the phase signal because these components are required to cancel one another. Thus, in accordance with the invention the known intricate circuit for generating a correction signal of the correct polarity, which circuit derives information about the polarity of the correction signal from the control signal, is replaced by a very simple circuit which derives this information directly from a phase comparison between the reference signal and the synchronising signal. The polarity signal containing the information about the correct polarity of the correction signal can then be derived directly from the phase signal from the phase comparator. The correction circuit can then be very simple.

In an embodiment of the invention the correction circuit comprises a limiting amplifier which is adapted to generate the correction signal by amplifying the polarity signal and limiting its amplitude to the predetermined value of the amplitude of the correction signal. Such a limiting amplifier simply enables a correction signal which is independent of the phase difference between the reference signal and the synchronising signal which are compared with one another to be derived from the polarity signal, which may be dependent on said difference.

In a further embodiment of the invention the amplitude of the correction signal corresponds to the amplitude of the phase signal when the reference signal and the synchronising signal are in the desired phase relationship. This correction-signal amplitude is adjusted to a fixed value. This ensures that the correction signal eliminates only those variations which result from the phase alternations of the synchronising signal. The components in the phase signal which are caused by the phase shift between the synchronising signal and the reference signal are not eliminated by the correction signal and therefore appear correctly in the control signal.

In a further embodiment of the invention the correction circuit comprises a second phase comparator for generating the polarity signal. This enables the phase signal to be generated by the first phase comparator and the polarity signal to be generated by the second phase comparator independently from each other, i.e. without influencing or disturbing each other. In another advantageous embodiment of the invention the second phase comparator may comprise an input for applying a second reference signal having a fixed phase difference with the first reference signal. This phase difference enables the polarity of the correction signal to be influenced in an effective manner.

In another embodiment of the invention the amplitude of the correction signal can be adjusted exactly to the predetermined value by means of a control circuit which adapts the amplitudes of the correction signal and the synchronising signal to one another. In conventional phase comparators the phase signal is generally proportional to the amplitudes of the signals to be compared with each other, i.e. also proportional to the amplitude of the synchronising signal. The amplitude of the reference signal from the reference oscillator is maintained constant but the amplitude of the synchronising signal may be subject to fluctuations or predetermined variations or alternations, the former in particular if this synchronising signal is derived from a composite signal which has passed a transmission path with a varying transfer characteristic. In order to ensure that also in this case control-signal variations caused by the phase alternation in the synchronising signal are cancelled correctly, the control circuit either adapts the amplitude of the correction signal to that synchronising signal or vice versa.

BRIEF DESCRIPTION OF THE DRAWINGS

A first and a second embodiment of a circuit arrangement in accordance with the invention will now be described in more detail, by way of example, with reference to FIGS. 1 and 2.

DETAILED DESCRIPTION OF THE PREFERRED EMBODIMENTS

Figure 1:
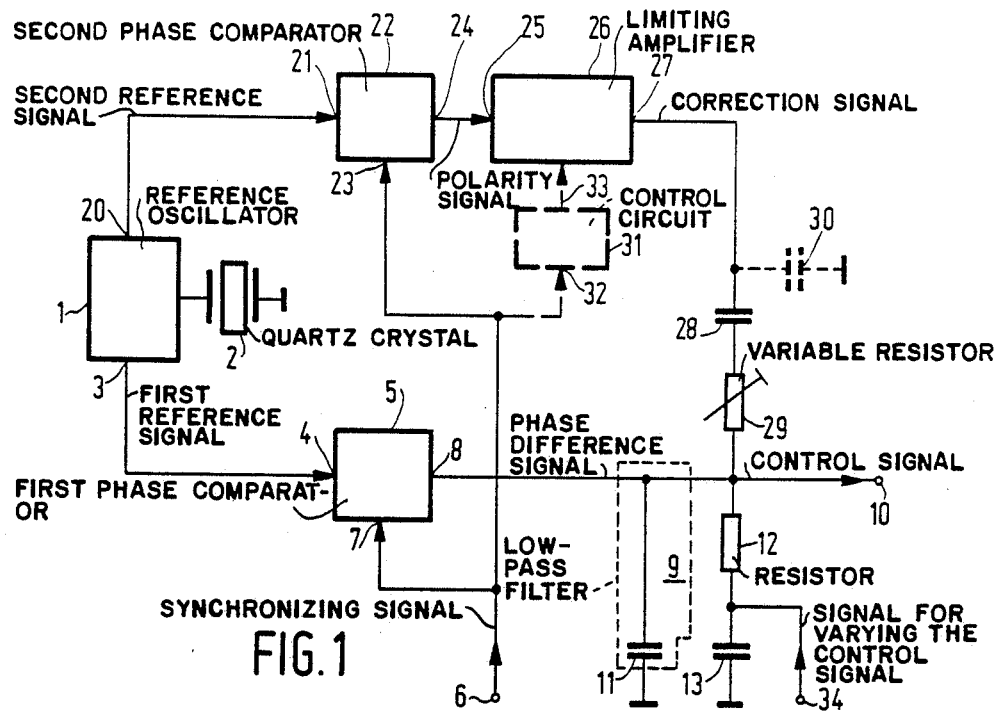
FIG. 1 is a diagram of one embodiment of the invention.

In the circuit arrangement shown in FIG. 1 a reference oscillator 1, whose oscillation frequency is stabilised by means of a quartz crystal 2, generates a first reference signal on a first output 3, which reference signal is applied to a first input of the first phase comparator 5. A synchronising signal is applied from a synchronising-signal terminal 6 to a second input 7 of the first phase comparator 5. The first phase comparator 5 compares the phase of the first reference signal and that of the synchronising signal and generates a phase signal corresponding to the phase difference between these two signals on its output 8.

From the output 8 of the first phase comparator 5 the phase signal is applied to a control-signal terminal 10 via a filter 9, on which terminal it is available as the control signal. For example, in a manner known per se this control signal may control the frequency of a signal supplied by a variable-frequency oscillator, as is effected in the circuit arrangement in accordance with DE-PS 32 02 210.

In the present example the filter 9 is a low-pass filter connected between the output 8 of the first phase comparator 5 and earth and comprising a first capacitor 11 arranged in parallel with a series connection of a fixed resistor 12 and a second capacitor. Such a lowpass filter serves for smoothing high-frequency components in the phase signal, for example for extracting the sum frequency of the reference signal and the synchronising signal.

In the present embodiment the reference oscillator 1 also has a second output 20, on which it generates a second reference signal which has a fixed phase shift relative to the first reference signal on the first output 3 and which is applied to a first input 21 of a second phase comparator 22. Further, the synchronising signal from the synchronising-signal terminal 6 is applied to a second input 23 of the second phase comparator 22. The second phase comparator 22 effects a phase comparison between the second reference signal and the synchronising signal to form a polarity signal which appears on an output 24. This polarity signal is applied to an input 25 of a limiting amplifier 26, which amplifies this signal and limits its amplitude to produce the correction signal on an output 27 of the limiting amplifier 26. Consequently, the correction signal always has a value determined by the limiting amplifier 26 and a polarity determined by the polarity signal. The second phase comparator 22 and the limiting amplifier 26 form part of a correction circuit.

From the output 27 of the limiting amplifier 26 the correction signal is applied to the control-signal terminal 10, where it is superimposed on the control signal from the output 8 of the first phase comparator 5. In the present embodiment this superposition is linear, i.e. additive. In order to ensure that the correction signal has the correct polarity, so that this signal cancels the components in the control signal which are caused by the phase alternation in the synchronising signal, the reference signals supplied by the reference oscillator 1 have a phase difference of 180° with each other. The phase comparators 5, 22 are suitably identical and the limiting amplifier 26 amplifies the polarity signal without polarity inversion. The synchronising signal applied to the synchronising-signal terminal 6 exhibits a predetermined sequence of phase shifts, for example such that the phase of the synchronising signal alternates between a first value and a second value in consecutive time intervals. The correction signal and the components in the control signal caused by the phase alternation in the synchronising signal then always have opposite polarities. The limiting amplifier ensures that the amplitude of the correction signal is such that it corresponds to the amplitude of the control-signal components caused by the phase alternation when the first reference signal is in the desired phase relationship with the synchronising signal. Thus, when the correction signal and the control signal are combined on the control signal terminal 10 the components in the control signal which are caused by the phase alternation are cancelled completely in the case of said desired phase relationship. Apart from the desired phase relationship between the first reference signal and the synchronising signal a non-zero difference is maintained between the correction signal and the control-signal components caused by the phase alternation.

In the present embodiment the correction signal is applied from the output 27 of the limiting amplifier 26 to the control-signal terminal 10 via a blocking capacitor 28 connected in series with a variable resistor 29. The blocking capacitor 28 prevents an undesired direct current between the output 27 of the limiting amplifier 26 and the output 8 of the first phase comparator 5. By means of the resistor 29 the amplitude of the correction signal can be adjusted.

A filter capacitor 30 (shown in broken lines) may be interposed between the output 27 of the limiting amplifier 26 and earth to short-circuit in particular spurious high-frequency signal components superimposed on the correction signal from the second phase comparator 22.

In the present embodiment the circuit arrangement may further comprise a control circuit 31 (also shown in broken lines) whose input 32 receives the synchronising signal from the synchronising-signal terminal 6 and which supplies a control signal to the limiting amplifier 26 via an output 33. The control circuit 31 detects the amplitude of the synchronising signal and by means of the control signal it controls the amplitude of the correction signal in such a way that if the amplitude of the synchronising signal varies the correction signal and the control-signal components caused by the phase alternation cancel each other if the first reference signal and the synchronising signal are in the desired phase relationship. In this way the influence of undesired fluctuations and predetermined variations in the amplitude of the synchronising signal can be eliminated, i.e. the correction signal can be adapted to the amplitude of the synchronising signal.

The circuit arrangement described above is suitable for use in a device for processing a PAL color video signal, as for example described in DE-PS 32 02 210. The PAL color burst signal, whose phase alternates from line to line, recurs at short time intervals as the synchronising signal. The circuit arrangement in accordance with the invention is then preferably constructed in such a way that the phase comparators are only rendered operative in these time intervals. The value of the control signal may be stored in a sample-and-hold circuit for the remaining time intervals.

In the present embodiment the filter 9 comprises a further terminal 34 via which a signal for varying the control signal on the control-signal terminal 10 can be applied. If, for example, the frequency of a variable-frequency oscillator is adjusted by means of the control signal this frequency can be influenced via the further terminal 34. For example, the output signal of an auxiliary lock-in detector may be applied to the terminal 34, as is known from DE-PS 32 02 210.

In the embodiment described in the foregoing the polarity signal is generated in a separate second phase comparator 22. However, it is for example alternatively possible to derive the polarity signal from the phase signal on the output 8 of the first phase comparator 5, in which case the polarity must be inverted to generate the correction signal.

Figure 2:
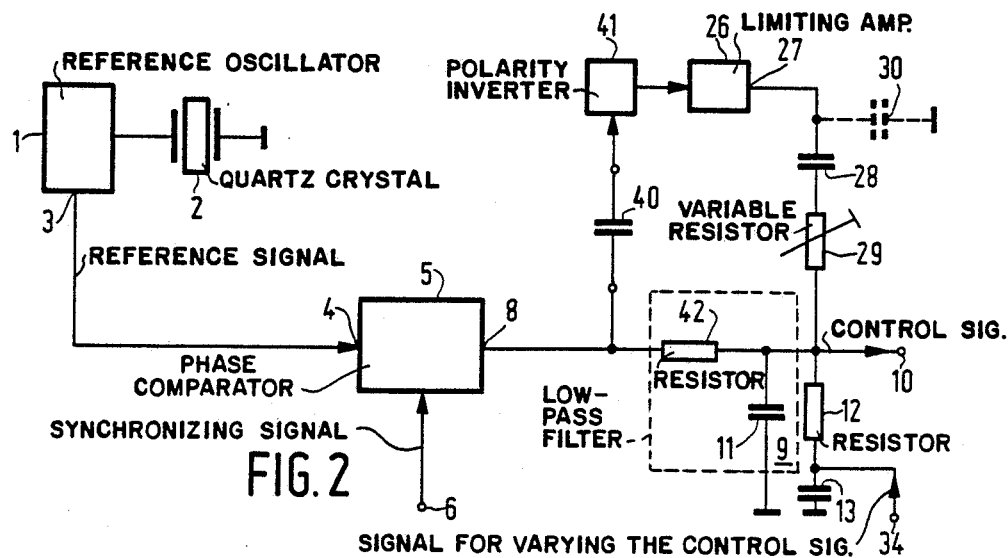
FIG. 2 is a diagram of another embodiment of the invention.

FIG. 2 shows an example of such a circuit arrangement. In this arrangement the elements already described with reference to FIG. 1 bear identical reference numerals.

The arrangement shown in FIG. 2 differs from the arrangement shown in FIG. 1 in that the reference oscillation comprises only a first output on which the first reference signal appears. In the same way as shown in FIG. 1, this reference signal is applied to the first phase comparator 5, where it is compared with the synchronising signal from the synchronising-signal terminal 6. From the output 8 of the first phase comparator 5 the phase signal is applied to the filter 9 from via a series resistor 42 and to the input 25 of the limiting amplifier 26 via a series capacitor and a polarity inverter 41. For the remainder the processing of the signals in the present circuit arrangement is as described with reference to FIG. 1.

In an example of a circuit arrangement as shown in FIG. 1 for use in a device for processing a PAL color video signal, the reference signals have the PAL chrominance carrier frequency of approximately 4.43 MHz and they are 180° phase-shifted relative to each other. The synchronising signal comprises line-frequency pulses whose phase changes through 90° from pulse to pulse. The first capacitor 11 and the blocking capacitor 28 are 10 nF, the second capacitor 13 is 4.7 $\mu$F, the fixed resistor 12 is 470 ohms and the variable resistor 29 is 2.2 kohms.

I claim:

1. A circuit for deriving a control signal from a video synchronizing signal, the synchronizing signal having a phase alternation of a predetermined predetermined sequence, the control signal being independent of the phase alternation, comprising:
   (a) a reference oscillator for supplying a reference signal;
   (b) phase comparator means responsive to the synchronizing signal and the reference signal for generating a phase signal corresponding to a phase difference therebetween;
   (c) a correction circuit including means for generating a polarity signal from the phase signal and means for generating from the polarity signal a correction signal of a predetermined amplitude, the polarity signal dictating a polarity of the correction signal; and
   (d) means for combining the phase signal and the correction signal to form the control signal so that variations caused by the phase alternation are cancelled and do not appear in the control signal.

2. A circuit for deriving a control signal from a video synchronizing signal, the synchronizing signal having a phase alternation of a predetermined periodic sequence, the control signal being independent of the phase alternation, comprising:
   (a) a reference oscillator for supplying first and second reference signals, the second reference signal having a fixed phase relative to the first reference signal;

(b) first phase comparator means responsive to the synchronizing signal and the first reference signal for generating the phase signal corresponding to a phase difference therebetween;

(c) a correction circuit including second phase comparator means responsive to the synchronizing signal and the second reference signal for generating a polarity signal and means for generating from the polarity signal a correction signal of a predetermined amplitude, the polarity signal dictating a polarity of the correction signal; and (d) means for combining the phase signal and the correction signal to form the control signal so that variations caused by the phase alternation are cancelled and do not appear in the control signal.

3. A circuit as claimed in claim 1 or 2 comprising a control circuit having an input coupled to receive the synchronizing signal, having an output coupled to a control input of the means for generating, and being responsive to changes in amplitude of the synchronizing signal, to produce a signal at its output such that the predetermined amplitude is controlled to cancel the variations caused by phase alternations.

4. A circuit as claimed in claim 1 wherein the amplitude of the correction signal corresponds to the amplitude of the phase signal when the reference signal and the synchronizing signal are in a desired phase relationship.

5. A circuit as claimed in claim 1 or 2, characterized in that the correction circuit (22, 26) comprises a limiting amplifier (26) which is adapted to generate the correction signal by amplifying the polarity signal and limiting its amplitude to the predetermined amplitude of the correction signal.

* * * * *